(12) United States Patent
Phuyal et al.

(10) Patent No.: US 11,582,829 B2
(45) Date of Patent: Feb. 14, 2023

(54) PRECONFIGURED UPLINK RESOURCE RELEASE COUNTER MANAGEMENT

(71) Applicant: QUALCOMM Incorporated, San Diego, CA (US)

(72) Inventors: Umesh Phuyal, San Diego, CA (US); Mungal Singh Dhanda, Slough (GB); Alberto Rico Alvarino, San Diego, CA (US); Le Liu, Fremont, CA (US); Ayan Sengupta, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

(21) Appl. No.: 16/949,456

(22) Filed: Oct. 29, 2020

(65) Prior Publication Data

US 2021/0136860 A1  May 6, 2021

Related U.S. Application Data

(60) Provisional application No. 62/929,652, filed on Nov. 1, 2019.

(51) Int. Cl.
*H04W 76/27* (2018.01)
*H04W 56/00* (2009.01)
*H04W 76/30* (2018.01)

(52) U.S. Cl.
CPC ......... *H04W 76/27* (2018.02); *H04W 56/001* (2013.01); *H04W 76/30* (2018.02)

(58) Field of Classification Search
CPC ... H04W 76/27; H04W 56/001; H04W 76/30; H04W 76/38
See application file for complete search history.

(56) References Cited

U.S. PATENT DOCUMENTS

| 11,246,182 B2* | 2/2022 | Wu ..................... H04W 72/046 |
| 2020/0107389 A1* | 4/2020 | Charbit ................. H04W 76/27 |

(Continued)

FOREIGN PATENT DOCUMENTS

| GB | 2581173 A | 8/2020 |
| WO | WO-2020167098 A1 | 8/2020 |

(Continued)

OTHER PUBLICATIONS

Ericsson: "[E906. E907] Remaining Open Issues in PUR", 3GPP Draft, R2-2004632, 3rd Generation Partnership Project (3GPP), Mobile Competence Centre, 650, Route Des Lucioles, F-06921 Sophia-Antipolis Cedex, France, vol. RAN WG2, No. Electronic meeting, Jun. 1, 2020-Jun. 12, 2020, May 21, 2020 (May 21, 2020), XP051887411, 10 Pages, Retrieved from the Internet: URL: https://ftp.3gpp.org/tsg_ran/WG2_RL2/TSGR2_110-e/Docs/R2-2004632.zip. R2-004632—Remaining open issues in PUR.docx [retrieved on May 21, 2020] the whole document.

(Continued)

*Primary Examiner* — Will W Lin
(74) *Attorney, Agent, or Firm* — Harrity & Harrity, LLP; Nerrie M. Zohn

(57) ABSTRACT

A method, an apparatus, and a computer program product for wireless communication are provided. Aspects described herein provide techniques and apparatuses associated with synchronizing a preconfigured uplink resource (PUR) release counter between a base station and a user equipment (UE). For example, the synchronization may be performed in connection with the UE entering a connected mode, the base station reconfiguring a PUR, and/or the like. By synchronizing the PUR release counter, misalignment of the PUR release counter between the UE and the base station may be reduced or eliminated. Reducing the misalignment of the PUR release counter reduces the occurrence of a (Continued)

premature release of a PUR, thus reducing UE interference and improving the likelihood of success of the UE's transmission.

32 Claims, 12 Drawing Sheets

(56) References Cited

U.S. PATENT DOCUMENTS

| | | | | |
|---|---|---|---|---|
| 2021/0274526 A1* | 9/2021 | Shin | ............... | H04W 76/27 |
| 2021/0385834 A1* | 12/2021 | Morozov | ............ | H04W 72/048 |
| 2021/0400567 A1* | 12/2021 | Sha | ............... | H04W 48/12 |
| 2022/0007392 A1* | 1/2022 | Chang | ............... | H04W 52/028 |
| 2022/0039098 A1* | 2/2022 | Chang | ............... | H04W 4/70 |
| 2022/0240341 A1* | 7/2022 | Kim | ............... | H04W 72/12 |

FOREIGN PATENT DOCUMENTS

| | | |
|---|---|---|
| WO | WO-2020167100 A1 | 8/2020 |
| WO | WO-2020226400 A1 | 11/2020 |

OTHER PUBLICATIONS

Ericsson: "PUR Data Transmission-Remaining Open Issues", 3GPP Draft, 3GPP TSG-RAN WG2 #107bis, R2-1913121—PUR Data Transmission-Remaining Open Issues, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804845, 4 pages, Retrieved from the Internet: URL: https://ftp.3gpp.org/tsg_ran/WG2_RL2/TSGR2_107bis/Docs/R2-1913121.zip. R2-1913121-PUR Data Transmission Remaining open issues.docx [retrieved on Oct. 4, 2019].

Ericsson: "Report on Email Discussion [106#60] D-PURTA Validation Criteria", 3GPP Draft, 3GPP TSG-RAN WG2 #107, R2-1910435, Report on Email Discussion [106#60] on TA Validation Criteria, 3rd Generation Partnership Project (3GPP), Mobile Competence Centre, 650, Route Des Lucioles, F-06921 Sophia-Ant, vol. RAN WG2, No. Prague, Czech Republic, Aug. 26, 2019-Aug. 30, 2019, Aug. 15, 2019 (Aug. 15, 2019), XP051768214, 29 Pages, Retrieved from the Internet: URL: http://www.3gpp.org/ftp/tsg_ran/WG2_RL2/TSGR2_107/Docs/R2-1910435.zip. [retrieved on Aug. 15, 2019] p. 5-p. 6 p. 25.

Huawei, et al., "Transmission in Preconfigured UL Resources", 3GPP Draft, 3GPP TSG RAN WG1 Meeting #96bis, R1-1903910, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699343, 12 Pages, Retrieved from the Internet: URL: http://www.3gpp.org/ftp/Meetings%5F3GPP%5FSYNC/RAN1/Docs/R1%2D1903910%2Ezip. [retrieved on Apr. 7, 2019] p. 2-page last.

Huawei: "Report of email Discussion [Post109e#46] [NBIOT/EMTC] PUR Open Issues", 3GPP Draft, 3GPP TSG-RAN WG2 Meeting#109bis-e, R2-2003746, 3rd Generation Partnership Project (3GPP), Mobile Competence Centre, 650, Route Des Lucioles, F-06921 Sophia-Antipolis Cedex, France, vol. RAN WG2, No. Online Meeting, Apr. 20, 2020-Apr. 30, 2020, Apr. 17, 2020 (Apr. 17, 2020), XP051876579, 36 Pages, Retrieved from the Internet: URL: https://ftp.3gpp.org/tsg_ran/WG2_RL2/TSGR2_109bis-e/Docs/R2-2003746.zip. R2-2003746 Report of [Post109e#46] [NBIOTEMTC] PUR open issues.doc [retrieved on Apr. 17, 2020] the whole document.

International Search Report and Written Opinion—PCT/US2020/070724—ISA/EPO—dated Feb. 11, 2021.

LG Electronics: "Discussion on Preconfigured UL Resources in MTC", 3GPP Draft, 3GPP TSG RAN WG1 Meeting #97, R1-1906682, Discussion on Preconfigured UL Resources in MTC, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728133, 7 Pages, Retrieved from the Internet: URL: http://www.3gpp.org/ftp/Meetings%5F3GPP%5FSYNC/RAN1/Docs/R1%2D1906682%2Ezip. [retrieved on May 13, 2019] p. 1-p. 6.

* cited by examiner

PRECONFIGURED UPLINK RESOURCE RELEASE COUNTER MANAGEMENT

CROSS-REFERENCE TO RELATED APPLICATION

This Patent Application claims priority to U.S. Provisional Patent Application No. 62/929,652, filed on Nov. 1, 2019, entitled "PRECONFIGURED UPLINK RESOURCE RELEASE COUNTER MANAGEMENT," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for preconfigured uplink resource (PUR) release counter management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

A UE may perform an uplink transmission using a configured uplink resource. In some cases, such a configured resource may be referred to as a preconfigured uplink resource (PUR). For example, a user equipment (UE) may use a PUR to support a one-step uplink access procedure for connected mode or idle mode UEs with a valid timing advance, allowing for data transmission in a first message between the UE and the base station. Thus, grant-free uplink data transmission may be performed, thereby improving uplink transmission efficiency and power consumption. This may be particularly useful for machine-type communication (MTC) UEs, Internet of Things (IoT) UEs, and/or the like. A UE may release a PUR based at least in part on a determination by the UE (e.g., a UE-triggered release) or an indication received from a network (e.g., a network-triggered release). For example, the UE may release a PUR based at least in part on a PUR release counter, which may be maintained by the UE and the base station. The PUR release counter may be configured with a maximum value, and may be incremented each time an uplink transmission is not performed on a PUR. If the PUR release counter reaches the maximum value, the UE and the base station may release the PUR. In some aspects, a UE's PUR release counter value and a base station's PUR release counter value may not align. For example, if a UE uses a PUR to perform an uplink transmission that the base station does not receive, then the base station may increment the PUR release counter while the UE does not increment the PUR release counter. If this causes the base station's PUR release counter to reach the maximum value, then the base station may release the PUR assigned for the UE and use the PUR's resources for other communications. Meanwhile, the UE may perform another transmission on the PUR, thereby causing the UE's transmission to fail and interfere with transmissions of other UEs. Furthermore, this may use computing resources (e.g., processor resources, memory resources, communication resources, and/or the like) of the UE in retransmitting the failed transmission and/or the other UEs in retransmitting transmissions that failed due to the interference, and may use computing resources of the base station in receiving such communications.

Aspects described herein provide techniques and apparatuses associated with synchronizing a PUR release counter between a base station and a UE. For example, the synchronization may be performed in connection with the UE entering a connected mode, the base station reconfiguring a PUR, and/or the like. By synchronizing the PUR release counter, misalignment of the PUR release counter between the UE and the base station may be reduced or eliminated. Reducing or eliminating the misalignment of the PUR release counter reduces or eliminates the occurrence of a premature release of a PUR, thus reducing UE interference and improving the likelihood of success of the UE's transmission. Thus, computing resources of the UEs and the base station are conserved.

In an aspect of the disclosure, a method, a user equipment (UE), a base station, an apparatus, and a computer program product are provided.

In some aspects, a method of wireless communication, performed by a UE configured with a PUR, may include synchronizing, with a base station, a count value of a PUR release counter in connection with at least one of: the UE entering a connected mode, or the UE receiving a reconfiguration of the PUR release counter; and selectively performing a transmission using a PUR or releasing the PUR based at least in part on the count value of the PUR release counter.

In some aspects, a method of wireless communication, performed by a base station, may include synchronizing, with a UE configured with a PUR, a count value of a PUR release counter of the UE in connection with at least one of: the UE entering a connected mode, or transmitting a reconfiguration of the PUR release counter to the UE; and selectively receiving a transmission using a PUR or releasing the PUR based at least in part on the count value of the PUR release counter.

In some aspects, a UE for wireless communication may include memory and one or more processors operatively coupled to the memory. The memory and the one or more processors may be configured to synchronize, with a base station, a count value of a PUR release counter in connection with at least one of: the UE entering a connected mode, or the UE receiving a reconfiguration of the PUR release counter, wherein the UE is configured with a PUR; and selectively perform a transmission using a PUR or releasing the PUR based at least in part on the count value of the PUR release counter.

In some aspects, a base station for wireless communication may include memory and one or more processors operatively coupled to the memory. The memory and the one or more processors may be configured to synchronize, with a UE configured with a PUR, a count value of a PUR release counter of the UE in connection with at least one of: the UE entering a connected mode, or transmitting a reconfiguration of the PUR release counter to the UE; and selectively receive a transmission using a PUR or releasing the PUR based at least in part on the count value of the PUR release counter.

In some aspects, a non-transitory computer-readable medium may store one or more instructions for wireless communication. The one or more instructions, when executed by one or more processors of a UE configured with a PUR, may cause the one or more processors to: synchronize, with a base station, a count value of a PUR release counter in connection with at least one of: the UE entering a connected mode, or the UE receiving a reconfiguration of the PUR release counter; and selectively perform a transmission using a PUR or releasing the PUR based at least in part on the count value of the PUR release counter.

In some aspects, a non-transitory computer-readable medium may store one or more instructions for wireless communication. The one or more instructions, when executed by one or more processors of a base station, may cause the one or more processors to: synchronize, with a UE configured with a PUR, a count value of a PUR release counter of the UE in connection with at least one of: the UE entering a connected mode, or transmitting a reconfiguration of the PUR release counter to the UE; and selectively receive a transmission using a PUR or releasing the PUR based at least in part on the count value of the PUR release counter.

In some aspects, an apparatus for wireless communication may include means for synchronizing, with a base station, a count value of a PUR release counter in connection with at least one of: the apparatus entering a connected mode, or the apparatus receiving a reconfiguration of the PUR release counter, wherein the apparatus is configured with a PUR; and means for selectively performing a transmission using a PUR or releasing the PUR based at least in part on the count value of the PUR release counter.

In some aspects, an apparatus for wireless communication may include means for synchronizing, with a UE configured with a PUR, a count value of a PUR release counter of the UE in connection with at least one of: the UE entering a connected mode, or transmitting a reconfiguration of the PUR release counter to the UE; and means for selectively receiving a transmission using a PUR or releasing the PUR based at least in part on the count value of the PUR release counter.

In some aspects, a method of wireless communication, performed by a UE configured with a PUR, may include synchronizing, with a base station, a count value of a PUR release counter in connection the UE receiving a configuration of the PUR release counter; and selectively performing a transmission using a PUR or releasing the PUR based at least in part on the count value of the PUR release counter.

In some aspects, a method of wireless communication, performed by a base station, may include synchronizing, with a UE configured with a PUR, a count value of a PUR release counter of the UE in connection with transmitting a configuration of the PUR release counter to the UE; and selectively receiving a transmission using a PUR or releasing the PUR based at least in part on the count value of the PUR release counter.

In some aspects, a UE for wireless communication may include memory and one or more processors operatively coupled to the memory. The memory and the one or more processors may be configured to synchronize, with a base station, a count value of a PUR release counter in connection with the UE receiving a configuration of the PUR release counter, wherein the UE is configured with a PUR; and selectively perform a transmission using a PUR or releasing the PUR based at least in part on the count value of the PUR release counter.

In some aspects, a base station for wireless communication may include memory and one or more processors operatively coupled to the memory. The memory and the one or more processors may be configured to synchronize, with a UE configured with a PUR, a count value of a PUR release counter of the UE in connection with transmitting a configuration of the PUR release counter to the UE; and selectively receive a transmission using a PUR or releasing the PUR based at least in part on the count value of the PUR release counter.

In some aspects, a non-transitory computer-readable medium may store one or more instructions for wireless communication. The one or more instructions, when executed by one or more processors of a UE configured with a PUR, may cause the one or more processors to: synchronize, with a base station, a count value of a PUR release counter in connection with receiving a configuration of the PUR release counter; and selectively perform a transmission using a PUR or releasing the PUR based at least in part on the count value of the PUR release counter.

In some aspects, a non-transitory computer-readable medium may store one or more instructions for wireless communication. The one or more instructions, when executed by one or more processors of a base station, may cause the one or more processors to: synchronize, with a UE configured with a PUR, a count value of a PUR release counter of the UE in connection with transmitting a configuration of the PUR release counter to the UE; and selectively receive a transmission using a PUR or releasing the PUR based at least in part on the count value of the PUR release counter.

In some aspects, an apparatus for wireless communication may include means for synchronizing, with a base station, a count value of a PUR release counter in connection with the apparatus receiving a configuration of the PUR release counter, wherein the apparatus is configured with a PUR; and means for selectively performing a transmission using a PUR or releasing the PUR based at least in part on the count value of the PUR release counter.

In some aspects, an apparatus for wireless communication may include means for synchronizing, with a UE configured with a PUR, a count value of a PUR release counter of the UE in connection with transmitting a configuration of the PUR release counter to the UE; and means for selectively receiving a transmission using a PUR or releasing the PUR based at least in part on the count value of the PUR release counter.

Aspects generally include a method, apparatus, system, computer program product, non-transitory computer-readable medium, user equipment, base station, wireless communication device, and/or processing system as substantially described with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
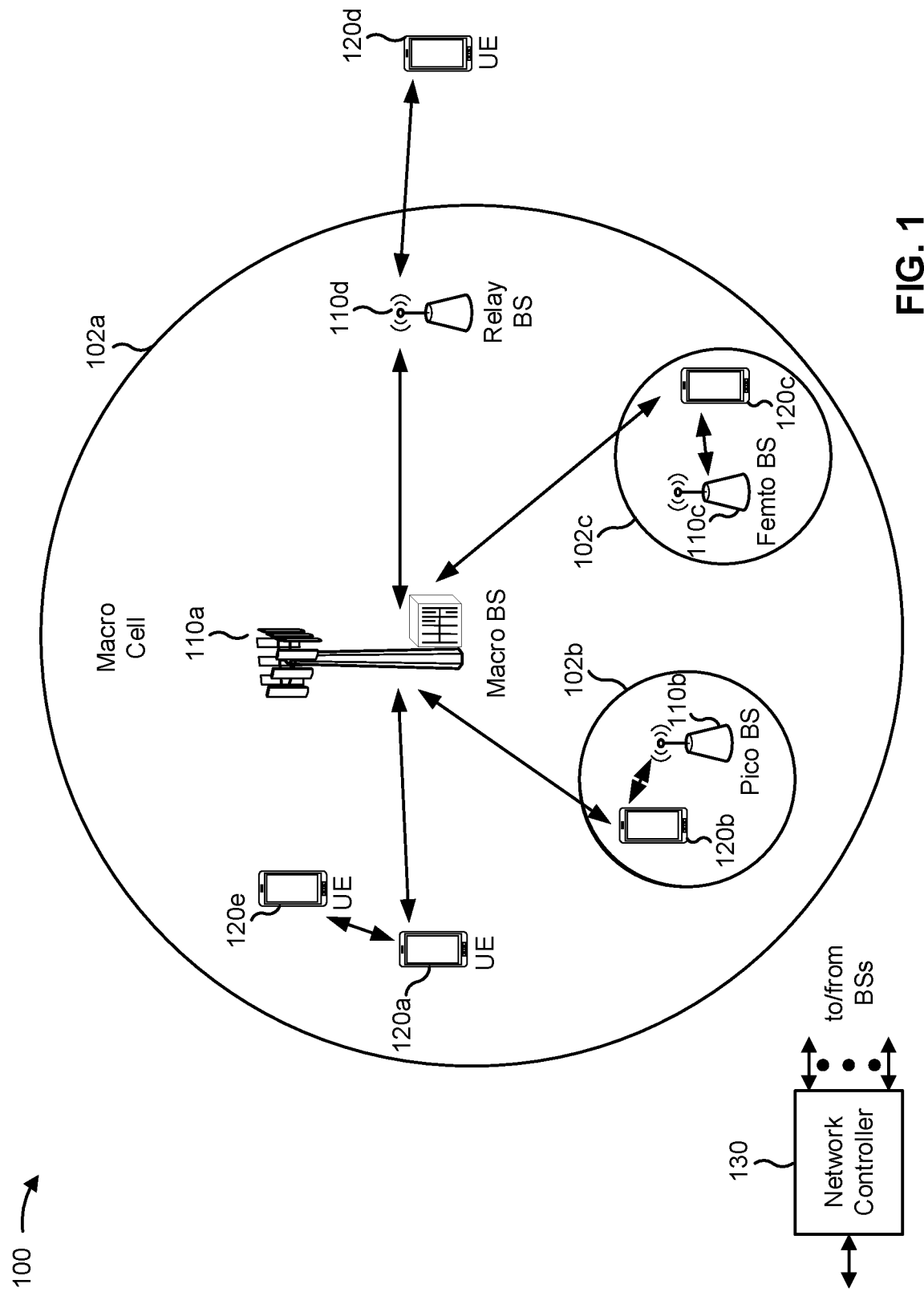
FIG. 1 is diagram illustrating an example of a wireless communication network, in accordance with various aspects of the present disclosure.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. In some aspects, a base station may configure resources for an uplink communication of the UE. Such a configured resource may be used for early data transmission (EDT) or a similar 2-step uplink access procedure. A configured resource for a UE transmission may be termed a preconfigured uplink resource (PUR). Techniques and apparatuses described herein provide for the management of a PUR release counter based at least in part on synchronizing one or more values of the PUR release counter between the base station and the UE.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided merely as an example. Other examples may differ from what is described with regard to FIG. 1.

Figure 2:
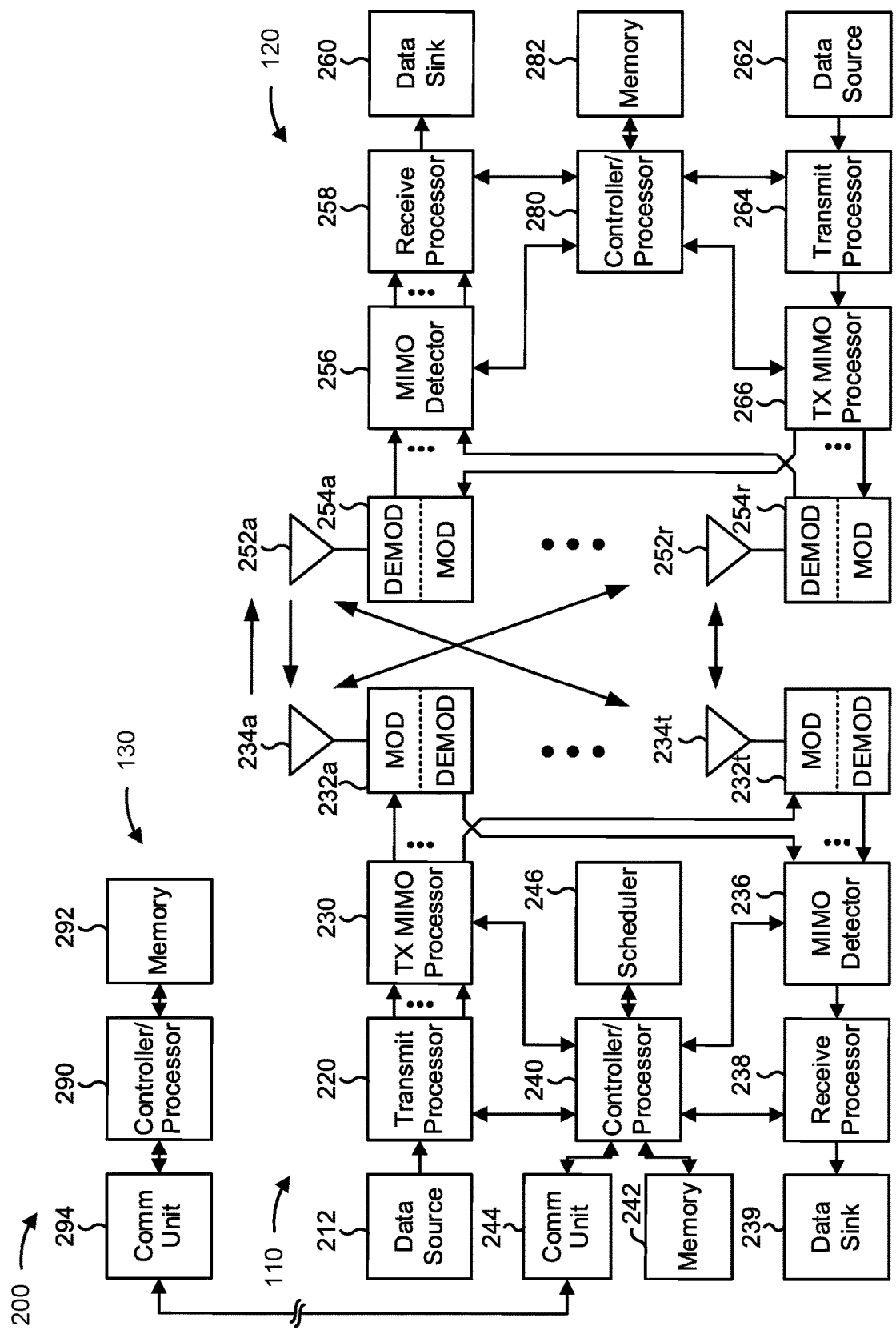
FIG. 2 is a diagram illustrating an example of a base station in communication with a UE in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength index (RSSI), reference signal received quality (RSRQ), channel quality indicator (CQI), and/or the like.

On the uplink, at UE 120, a transmit processor 264 may receive and process data from a data source 262 (e.g., in connection with a PUR or an EDT) and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PUR release counter management, as described in more detail elsewhere herein. For example, controller/processor 240 of base station 110, controller/processor 280 of UE 120, and/or any other component(s) of FIG. 2 may perform or direct operations of, for example, method 700 of FIG. 7, method 800 of FIG. 8, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

FIGS. 3-6 are diagrams illustrating examples 300, 400, 500, and 600 of management of a PUR release counter based at least in part on synchronizing the PUR release counter. As shown, examples 300, 400, 500, and 600 include a UE 120 and a BS 110. Each example is described in turn below.

Figure 3:
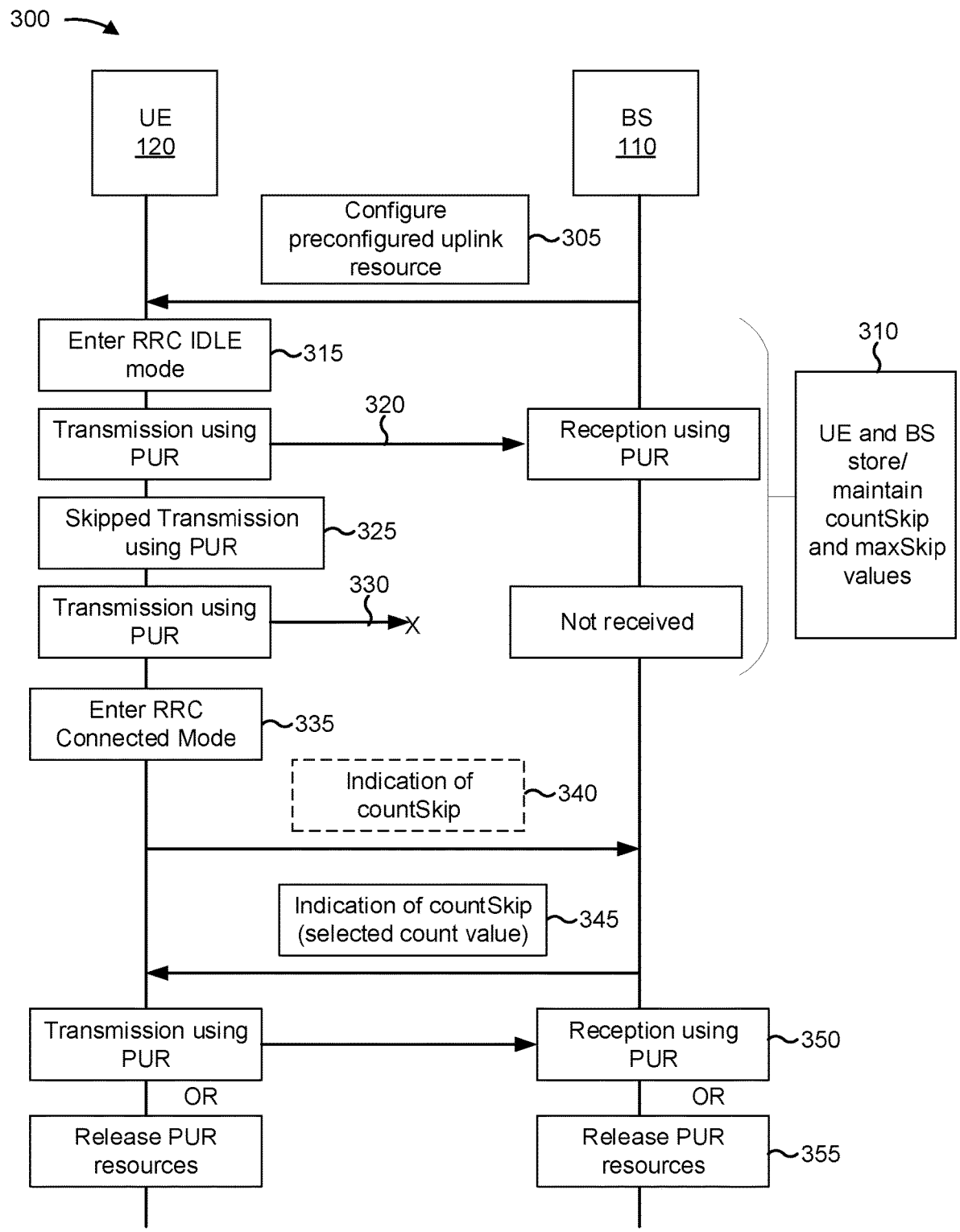
FIGS. 3-6 are diagrams illustrating examples of management of a PUR release counter based at least in part on synchronizing the PUR release counter, in accordance with various aspects of the present disclosure.

Example 300, shown in FIG. 3, shows an example of synchronizing the PUR release counter based at least in part on a selected count value signaled by a BS 110.

As shown in FIG. 3, and at 305, the BS 110 may configure a PUR for the UE 120. In some aspects, the UE 120 may be in a connected mode (e.g., a radio resource control (RRC) connected mode) when the PUR is configured. In some aspects, the UE 120 may request the PUR. For example, the UE 120 may transmit, to the BS 110, a request for PUR resources. In some aspects, the BS 110 may configure the PUR based at least in part on the request for PUR resources. In some aspects, the BS 110 may configure the PUR without receiving the request for PUR resources. In some aspects, the BS 110 may configure the PUR using an RRC message, such as an RRC connection release message and/or the like. In some aspects, the BS 110 may configure the UE 120 with countSkip and/or maxSkip values, which are described in more detail below. In some aspects, the BS 110 may configure the maxSkip value via an RRC parameter, such as pur-ImplicitReleaseAfter or the like. For example, the RRC parameter may be provided as part of a pur-Config parameter.

As shown at 310, the UE 120 and the BS 110 may store a current value of the PUR release counter (hereinafter referred to as "countSkip", also referred to herein as a "count value") and a configured maximum value for the PUR release counter (hereinafter referred to as "maxSkip") values. In other words, the UE 120 and the BS 110 may maintain respective PUR release counters. A PUR release counter may also be referred to as a PUR skip counter, a skip counter, a counter, and/or the like. The UE 120 may increment countSkip (referred to also as a count value of the PUR release counter) each time the UE 120 does not use the PUR occasion while the UE 120 is in the idle mode, and each time the UE 120 performs a PUR transmission and does not receive an acknowledgment from the BS 110. The BS 110 may increment countSkip each time the BS 110 does not transmit an acknowledgment for a PUR transmission. When the value of countSkip matches the value of maxSkip, the UE 120 or the BS 110 may release the PUR. In some aspects, the value of countSkip may be reset to zero after a PUR transmission. In some aspects, the value of countSkip may not be reset to zero after a PUR transmission.

As shown at 315, the UE 120 may enter an RRC idle mode. As shown at 320, the UE 120 may perform a transmission using the PUR, and the BS 110 may receive the transmission using the PUR. Thus, neither the UE 120 nor the BS 110 may increment the current value of the PUR release counter. As shown at 325, the UE 120 may skip a transmission using the PUR. Thus, the UE 120 and the BS 110 may increment the current value of the PUR release counter. As shown at 330, the UE 120 may perform a transmission using the PUR that is not received by the BS 110. In this case, in some circumstances, the UE 120 may not increment countSkip and the BS 110 may increment countSkip, since the UE 120 may assume that the transmission using the PUR was performed (e.g., not skipped) while the BS 110 did not receive the transmission using the PUR. The techniques described herein may enable the UE 120 and the BS 110 to synchronize values of countSkip, thereby reducing the likelihood that the BS 110 prematurely releases the PUR. Thus, computing resources of the UE 120 and the BS 110 are conserved. The operations shown at 315, 320, 325, and 330 may occur in any order. Furthermore, in some cases, multiple of one of the operations shown at 315, 320, 325, and 330 may occur, or one or more of the operations shown at 315, 320, 325, and 330 may not occur.

As shown at 335, the UE 120 may enter a connected mode, such as an RRC connected mode. For example, the PUR configuration may remain valid when switching from idle mode to connected mode, or from connected mode to idle mode, unless the PUR configuration is reconfigured or released. In this case, the UE 120 and the BS 110 may synchronize the value of countSkip based at least in part on the UE 120 entering the connected mode, as described in more detail in connection with reference numbers 340 and 345.

As shown at 340, the UE 120 may provide an indication of the count value of the PUR release counter (e.g., countSkip). In some aspects, the UE 120 may provide the indication of the count value using an RRC message. For example, the RRC message may use an information element or a field in an RRC uplink message. As another example, the UE 120 may provide the indication of the count value in a PUR configuration request message. In some aspects, the UE 120 may provide the indication of the count value using a media access control (MAC) control element (CE). In some aspects, the UE 120 may provide the indication of the count value in the transmission using the PUR (shown at 350). In some aspects, the UE 120 may not provide the indication of the count value.

As shown at 345, the BS 110 may provide information identifying a selected count value (e.g., a selected value of countSkip). In some aspects, the BS 110 may provide the information identifying the selected count value in connection with the indication of the count value received from UE 120. In some aspects, the BS 110 may provide the information identifying the selected count value independent of whether the UE 120 sends the indication of the count value. The UE 120 may set the UE 120's count value to match the selected count value, thereby synchronizing the count values of the UE 120 and the BS 110.

In some aspects, the selected count value may be different from the UE 120's count value. For example, the BS 110 may determine a selected count value different from the UE 120's count value, and may indicate to the UE 120 the selected count value. Thus, the count values of the BS 110 and the UE 120 may be aligned. In some aspects, the selected count value may match the UE 120's count value. For example, the BS 110 may determine the selected count value to equal the UE 120's count value, or the BS 110's count value may already match the UE 120's count value.

Thus, the alignment of the count values of the BS 110 and the UE 120 may be confirmed.

In some aspects, the BS 110 may signal the selected count value using RRC signaling. For example, the BS 110 may signal the selected count value using an information element or a field in a downlink RRC message, such as an RRC connection release message and/or the like. As another example, the BS 110 may signal the selected count value in a PUR configuration message. For example, the PUR configuration message may include a field that indicates the selected count value. In some aspects, the BS 110 may signal the selected count value using a MAC CE.

In some aspects, the BS 110 may signal an updated maximum count value, which is described in more detail in connection with examples 400-600.

As shown at 360, the UE 120 may perform a PUR transmission using the PUR, or, as shown at 370, the UE 120 and the BS 110 may release the PUR. For example, the UE 120 may perform the PUR transmission when the count value has not reached the maximum value after synchronization. The UE 120 and the BS 110 may release the PUR when the count value has reached the maximum value after synchronization. For example, the BS 110 may signal a selected count value that is equal to the maximum count value. In this case, the UE 120 may release the PUR. This may be considered a PUR release message, or a network indication to release the PUR. in some aspects, the UE may further perform a fallback to a random access procedure or an early data transmission procedure.

Figure 4:
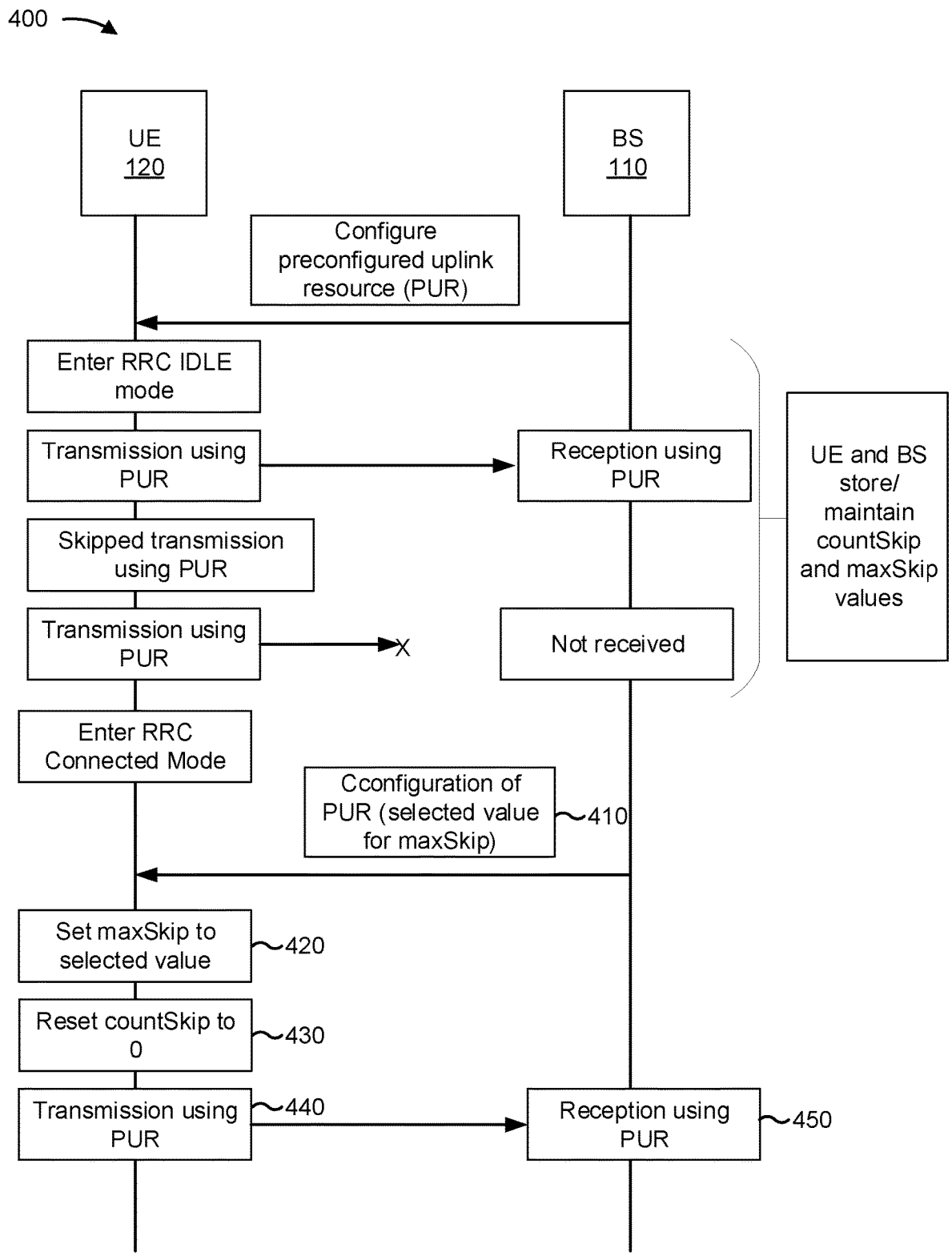

Example 400, shown in FIG. 4, is an example where the UE 120 and the BS 110 synchronize the PUR release counter based at least in part on reconfiguring the PUR. The operations before reconfiguration of the PUR (shown at 410) are described in more detail in connection with FIG. 3. While many aspects described herein are described in connection with reconfiguration messages, it should be noted that these aspects can be implemented using any sort of signal, such as RRC signaling (e.g., an initial RRC configuration or an RRC reconfiguration) or the like. The aspects described herein are not limited to those involving reconfiguration messages (e.g., a message that is subsequent to an initial configuration message). Further, while some aspects described herein are described in connection with configuration messages, it should be noted that these aspects can be implemented using any sort of signal, such as RRC signaling (e.g., an initial RRC configuration or an RRC reconfiguration) or the like.

As shown at 410, the BS 110 may reconfigure the PUR. For example, the BS 110 may transmit a PUR reconfiguration message to the UE 120. As further shown, the PUR reconfiguration message may indicate a selected value for maxSkip (i.e., the maximum value of the PUR release counter, such as a pur-ImplicitReleaseAfter of a pur-Config parameter). In some aspects, the PUR reconfiguration message may not indicate a selected value for maxSkip. This is described in more detail in connection with FIGS. 5 and 6.

As shown at 420, the UE 120 may set maxSkip to the selected value. As shown at 430, the UE 120 may set the count value (e.g., countSkip) to an initial value (e.g., zero). For example, the UE 120 may set the count value to the initial value based at least in part on the PUR reconfiguration message indicating the selected value for maxSkip. As shown at 440, the UE 120 may perform a PUR transmission using the PUR.

Figure 5:
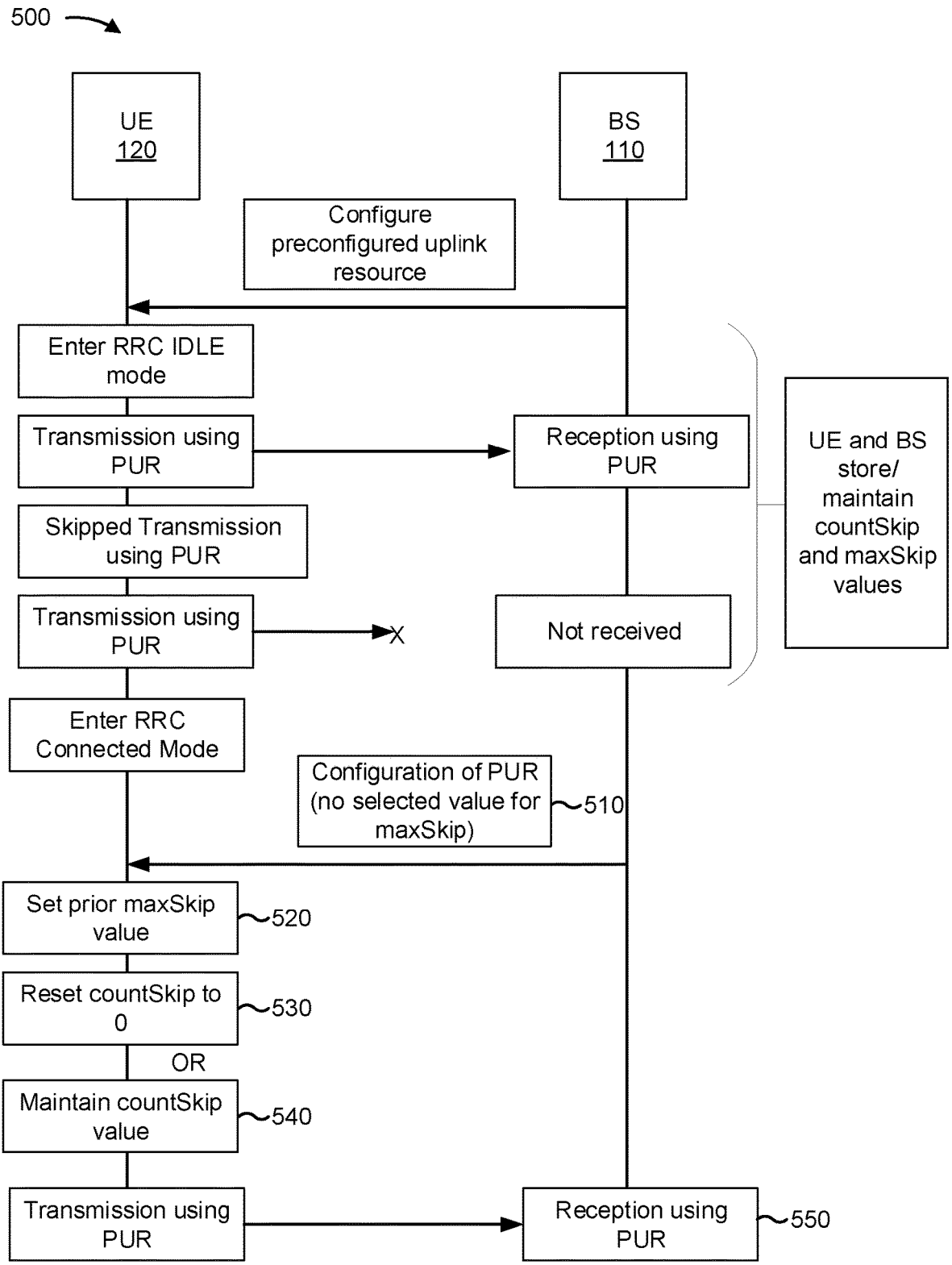

Example 500, shown in FIG. 5, is an example where the UE 120 and the BS 110 synchronize the PUR release counter based at least in part on a PUR reconfiguration message. The operations before reconfiguration of the PUR (shown at 510) are described in more detail in connection with FIG. 3.

As shown at 510, the BS 110 may reconfigure the PUR. For example, the BS 110 may transmit a PUR reconfiguration message. Here, the PUR reconfiguration message does not include a selected value for maxSkip. Accordingly, as shown at 520, the UE 120 may set a prior maxSkip value of the UE 120. For example, the UE 120 may set the maxSkip value to an initial configured value or a subsequent reconfigured value. In one embodiment, as shown at 530, the UE 120 may reset the value of countSkip to zero based at least in part on receiving the PUR reconfiguration message without the selected value of maxSkip. In other embodiments, as shown at 540, the UE 120 may maintain a prior value of countSkip.

Thus, the BS 110 and the UE 120 may synchronize the PUR release counter based at least in part on transmitting a PUR reconfiguration message without an updated maximum count value. As shown at 550, the UE 120 may transmit the PUR transmission, and the BS 110 may receive the PUR transmission.

Figure 6:
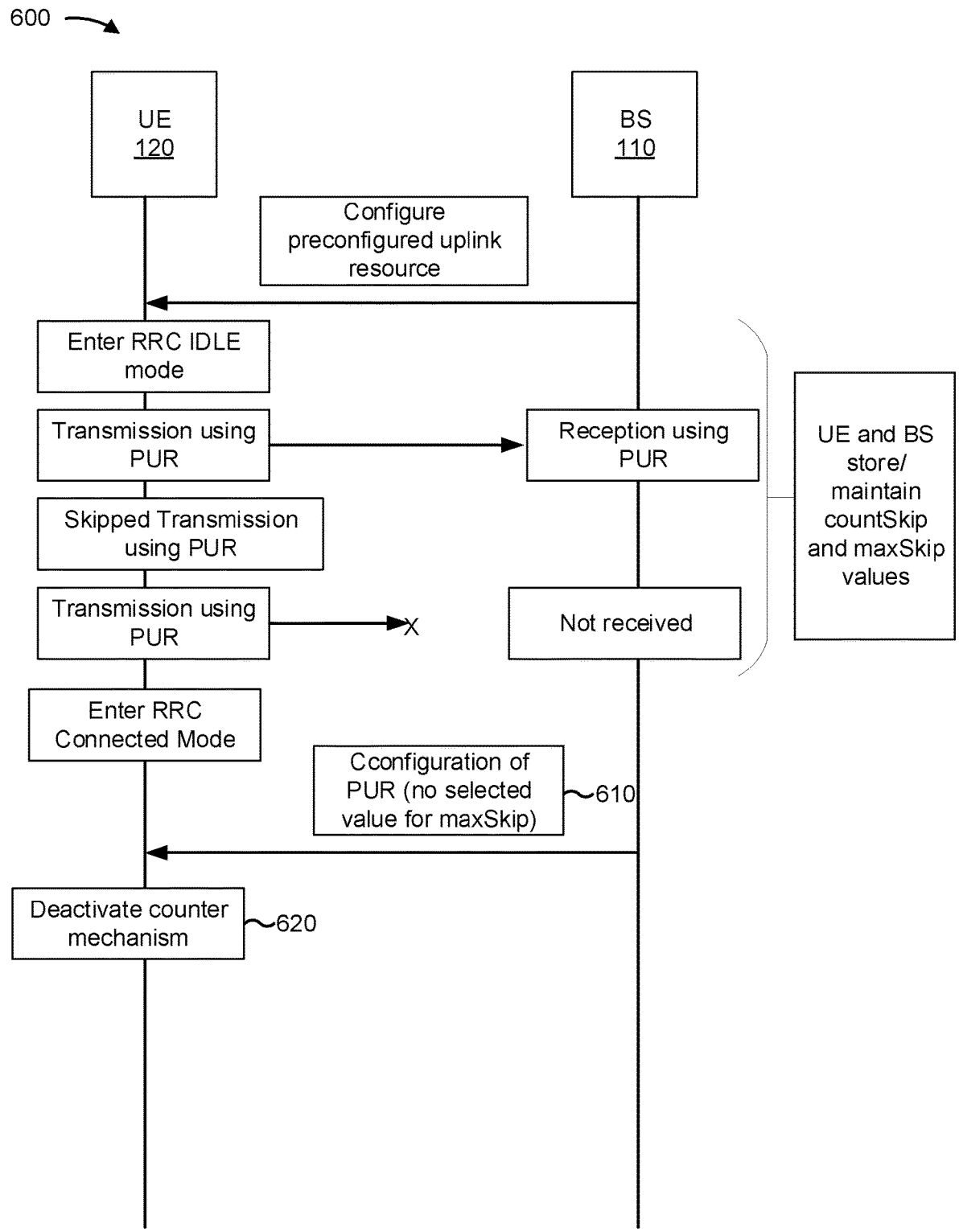

Example 600, shown in FIG. 6, is an example where the UE 120 and the BS 110 synchronize the PUR release counter based at least in part on a PUR reconfiguration message. The operations before reconfiguration of the PUR (shown at 610) are described in more detail in connection with FIG. 3.

As shown at 610, the BS 110 may transmit a PUR reconfiguration message that does not indicate a selected value for maxSkip. Accordingly, as shown at 620, the UE 120 may deactivate the PUR counter mechanism. For example, the UE 120 may consider the PUR release counter not to be configured, unless the PUR release counter is subsequently reconfigured.

As indicated above, FIGS. 3-6 are provided as one or more examples. Other examples may differ from what is described with respect to FIGS. 3-6.

Figure 7:
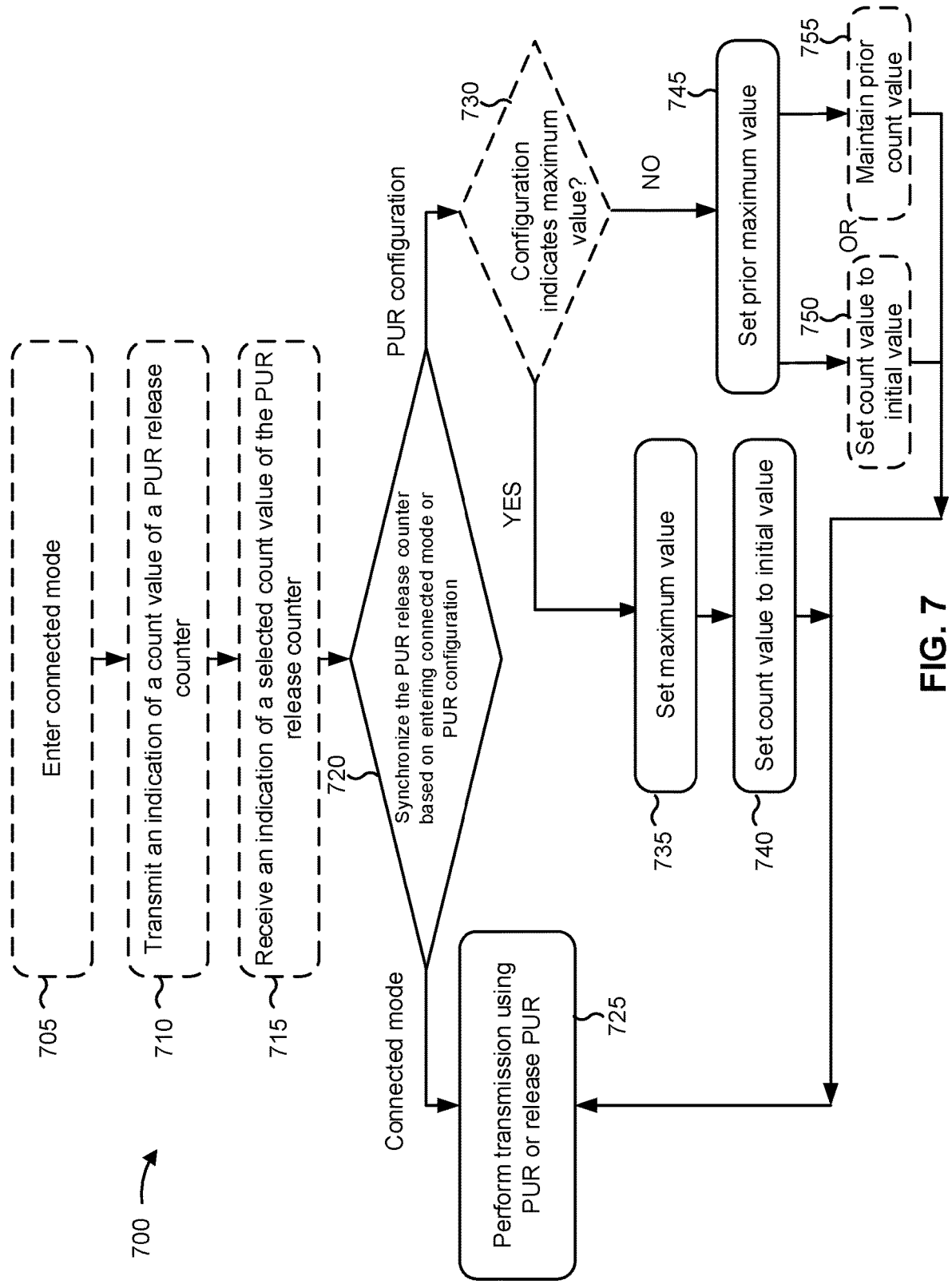
FIGS. 7-8 are flowcharts illustrating examples of management of a PUR release counter based at least in part on synchronizing the PUR release counter, in accordance with various aspects of the present disclosure.

FIG. 7 is a flowchart of a method 700 of wireless communication. The method may be performed by a UE (e.g., the UE 120 of FIG. 1, the apparatus 902/902', and/or the like).

At 705, the UE (e.g., using controller/processor 280, transmit processor 264, TX MIMO processor 266, MOD 254, antenna 252, and/or the like) may enter a connected mode, such as an RRC connected mode. At 710, the UE (e.g., using controller/processor 280, transmit processor 264, TX MIMO processor 266, MOD 254, antenna 252, and/or the like) may optionally transmit an indication of a count value of a PUR release counter. For example, the UE may transmit, before the count value of the PUR release counter is synchronized, an indication of the count value of the PUR release counter. In some aspects, the count value may include a value of countSkip, such as a current value of countSkip of the UE. The UE may provide the indication of the count value based at least in part on entering a connected mode, transmitting a PUR transmission, receiving a PUR configuration or reconfiguration message, and/or the like. In some aspects, the indication of the count value of the PUR release counter is transmitted using radio resource control (RRC) signaling. In some aspects, the indication of the count value of the PUR release counter is transmitted using a media access control (MAC) control element (CE).

At 715, the UE (e.g., using antenna 252, DEMOD 254, MIMO detector 256, receive processor 258, controller/processor 280, and/or the like) may receive an indication of a selected count value of the PUR release counter. For example, the UE may receive the indication based at least in part on entering a connected mode. In some aspects, the UE may receive, from the base station, an indication of a selected count value for the PUR release counter, wherein the synchronization is performed in accordance with the indication of the selected count value for the PUR release counter. The selected count value may be a value of countSkip determined by a BS. For example, the selected count value may be equal to the indication of the count value transmitted by the UE, or may be different from the indication of the count value transmitted by the UE. In some aspects, the selected count value may be based at least in part on the indication of the count value transmitted by the UE. In some aspects, the selected count value may not be based at least in part on the indication of the count value transmitted by the UE. In some aspects, the count value before the synchronization matches the selected count value for the PUR release counter. In some aspects, the count value before the synchronization is different from the selected count value. In some aspects, the indication of the selected count value for the PUR release counter is received after transmitting, to the base station, an indication of the count value, wherein the count value is a value before the synchronization. In some aspects, the indication of the selected count value for the PUR release counter is received using radio resource control (RRC) signaling. In some aspects, the indication of the selected count value for the PUR release counter is received using a media access control (MAC) control element (CE).

At 720, the UE (e.g., using controller/processor 280, transmit processor 264, TX MIMO processor 266, MOD 254, antenna 252, and/or the like) may synchronize the PUR release counter based at least in part on entering a connected mode or receiving a PUR configuration message. For example, if the UE has received an indication of a selected count value, the UE may use the selected count value as the count value of the PUR release counter. In some aspects, the UE may set or modify a maximum value of the PUR release counter, may set the count value to an initial value, or may set or maintain a count value, based at least in part on content of the PUR configuration message, as described below.

At 725, the UE (e.g., using controller/processor 280, transmit processor 264, TX MIMO processor 266, MOD 254, antenna 252, and/or the like) may perform a transmission using the PUR, or may release the PUR. For example, the UE may perform the transmission if the count value does not match the maximum value, and may release the PUR if the count value matches the maximum value. In some aspects, the UE may be configured with a count value that matches the maximum value. For example, the UE may synchronize the count value of the PUR release counter to equal a maximum value of the PUR release counter. In this case, the UE may perform a random access procedure or an early data transmission procedure based at least in part on synchronizing the count value of the PUR release counter to equal the maximum value of the PUR release counter.

In some aspects, the UE may optionally receive a configuration (not shown in FIG. 7, and shown, for example, in FIGS. 4-6). At 730, the UE may determine whether the configuration indicates a parameter indicating a maximum value of the PUR release counter. If the configuration indicates a parameter indicating the maximum value (block 730—YES), then, at 735, the UE may set the maximum value of the PUR release counter based at least in part on the parameter, and, at 740, may set the count value to an initial value based at least in part on the configuration. Thereafter, the UE may proceed to block 725.

If the configuration does not indicate a parameter indicating the maximum value, at 745, the UE may set a prior maximum value of the PUR release counter based at least in part on the configuration. The UE may set the count value to an initial value based at least in part on the configuration at 750, or may maintain a prior value of the PUR release counter as the count value based at least in part on the configuration at 755. Thereafter, the UE may proceed to block 725. In some aspects, the UE may deactivate the PUR release counter based at least in part on the configuration of the PUR release counter including no parameter indicating a maximum value of the PUR release counter (shown, for example, at 620 of FIG. 6).

Method 700 may include additional aspects, such as any single aspect or any combination of aspects described above, below, and/or in connection with one or more other processes described elsewhere herein.

In a first aspect, method 700 may include transmitting, before the count value of the PUR release counter is synchronized, an indication of the count value of the PUR release counter of the UE.

In a second aspect, alone or in combination with the first aspect, the indication of the count value of the PUR release counter of the UE is transmitted using radio resource control (RRC) signaling.

In a third aspect, alone or in combination with one or more of the first through second aspects, the indication of the count value of the PUR release counter of the UE is transmitted using a media access control (MAC) control element (CE).

In a fourth aspect, alone or in combination with one or more of the first through third aspects, method 700 may include receiving, from the base station, an indication of a selected count value for the PUR release counter, wherein the synchronization is performed in accordance with the indication of the selected count value for the PUR release counter.

In a fifth aspect, alone or in combination with one or more of the first through fourth aspects, the count value of the UE before the synchronization matches the selected count value for the PUR release counter.

In a sixth aspect, alone or in combination with one or more of the first through fifth aspects, the count value of the UE before the synchronization is different from the selected count value.

In a seventh aspect, alone or in combination with one or more of the first through sixth aspects, the indication of the selected count value for the PUR release counter is received after transmitting, to the base station, an indication of the count value of the UE, wherein the count value is a value before the synchronization.

In an eighth aspect, alone or in combination with one or more of the first through seventh aspects, the indication of the selected count value for the PUR release counter is received using radio resource control (RRC) signaling.

In a ninth aspect, alone or in combination with one or more of the first through eighth aspects, the indication of the selected count value for the PUR release counter is received using a media access control (MAC) control element (CE).

In a tenth aspect, alone or in combination with one or more of the first through ninth aspects, releasing the PUR is based at least in part on synchronizing the count value of the PUR release counter to equal a maximum value of the PUR release counter.

In an eleventh aspect, alone or in combination with one or more of the first through tenth aspects, method 700 may include performing a random access procedure or an early data transmission procedure based at least in part on synchronizing the count value of the PUR release counter of the UE to equal the maximum value of the PUR release counter.

In a twelfth aspect, alone or in combination with one or more of the first through eleventh aspects, method 700 may include setting the count value of the PUR release counter of the UE to an initial value.

In a thirteenth aspect, alone or in combination with the twelfth aspect, the configuration of the PUR release counter indicates a parameter indicating a maximum value for the PUR release counter, and the method 700 further comprises setting the maximum value of the PUR release counter based at least in part on the parameter; and setting the count value to an initial value based at least in part on the configuration.

In a fourteenth aspect, alone or in combination with one or more of the first through thirteenth aspects, the configuration of the PUR release counter includes no parameter indicating a maximum value of the PUR release counter, and the method 700 further comprises: setting a prior maximum value of the PUR release counter based at least in part on the configuration; and setting the count value to an initial value based at least in part on the configuration.

In a fifteenth aspect, alone or in combination with one or more of the first through fourteenth aspects, the configuration of the PUR release counter includes no parameter indicating a maximum value of the PUR release counter, and method 700 further comprises: setting a prior maximum value of the PUR release counter based at least in part on the configuration; and maintaining a prior value of the PUR release counter as the count value based at least in part on the configuration.

In a sixteenth aspect, alone or in combination with one or more of the twelfth and thirteenth aspects, the configuration of the PUR release counter includes no parameter indicating a maximum value of the PUR release counter, and method 700 further comprises deactivating the PUR release counter based at least in part on the configuration of the PUR release counter including no parameter indicating a maximum value of the PUR release counter.

In a seventeenth aspect, alone or in combination with one or more of the first through sixteenth aspects, method 700 may include entering the connected mode.

In an eighteenth aspect, alone or in combination with one or more of the first through seventeenth aspects, method 700 may include receiving the configuration of the PUR release counter.

In a nineteenth aspect, alone or in combination with one or more of the first through eighteenth aspects, method 700 may include receiving, from the base station, a message without a selected count value, the message indicating that the count value of the UE is synchronized with a count value of the base station.

In a sixteenth aspect, alone or in combination with one or more of the twelfth and thirteenth aspects, the initial value is zero.

In a seventeenth aspect, alone or in combination with one or more of the twelfth, thirteenth, and sixteenth aspects, the configuration is a configuration message.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
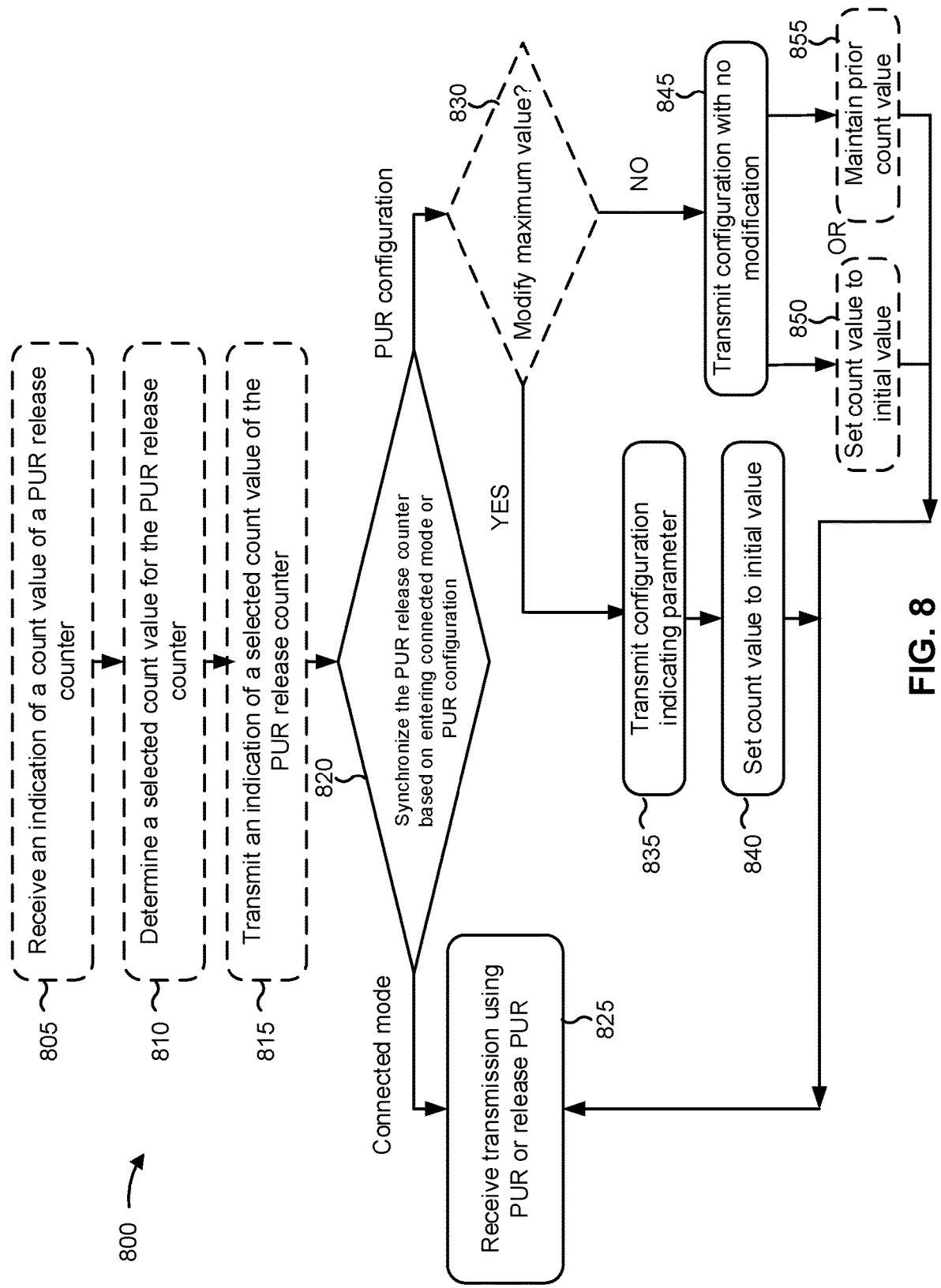

FIG. 8 is a flowchart of a method 800 of wireless communication. The method may be performed by a base station (e.g., the BS 110 of FIG. 1, the apparatus 1102/1102', and/or the like).

At 805, the base station may receive an indication of a count value of a PUR release counter. For example, the base station may receive, before the count value of the PUR release counter is synchronized, an indication of the count value of the PUR release counter. In such a case, in some aspects, the base station may synchronize the count value to match the indication of the count value, as described below. In some aspects, the count value may include a value of countSkip, such as a current value of countSkip of the UE. The base station may receive the indication of the count value based at least in part on the UE entering a connected mode, transmitting a PUR transmission, receiving a PUR configuration or reconfiguration message, and/or the like.

At 810, the base station (e.g., using controller/processor 240 and/or the like) may determine a selected count value (e.g., countSkip) for the PUR release counter. For example, the base station may determine the selected count value based at least in part on the indication of the count value received from the UE. As another example, the base station may determine the selected count value independently from the indication of the count value received from the UE. In some aspects, the selected count value for the PUR release counter matches the indication of the count value of the PUR release counter. In some aspects, the selected count value for the PUR release counter is different from the indication of the count value of the PUR release counter.

At 815, the base station (e.g., using controller/processor 240, transmit processor 220, TX MIMO processor 230, MOD 232, antenna 234, and/or the like) may transmit an indication of the selected count value of the PUR release counter, wherein the synchronization is performed in accordance with the indication of the selected count value for the PUR release counter. In some aspects, the base station may receive, before the count value is synchronized and before the indication of the selected count value is transmitted, an indication of the count value of the PUR release counter, as described above.

At 820, the base station (e.g., using controller/processor 240, transmit processor 220, TX MIMO processor 230, MOD 232, antenna 234, and/or the like) may synchronize the PUR release counter based at least in part on the UE entering a connected mode or the base station transmitting a configuration of the PUR release counter to the UE. For example, if the base station has transmitted an indication of a selected count value, the UE may use the selected count value as the count value of the PUR release counter. In some aspects, the base station may set or modify a maximum value of the PUR release counter, may set the count value to an initial value, or may set or maintain a count value, based at least in part on content of the configuration of the PUR release counter, as described below. The configuration of the PUR release counter is also referred to herein as a configuration and a PUR configuration message.

In some aspects, the base station may synchronize the count value of the PUR release counter to equal a maximum value of the PUR release counter, wherein synchronizing the count value of the PUR release counter to equal the maximum value of the PUR release counter triggers a fallback to a random access procedure or an early data transmission procedure (not shown). For example, the UE may perform the fallback to the random access procedure or the early data transmission procedure.

At 825, the base station may receive a transmission using the PUR, or may release the PUR. For example, the base station may receive the transmission (or the UE may perform the transmission) if the count value does not match the maximum value, and may release the PUR if the count value matches the maximum value. In some aspects, the base station may configure the UE with a count value that matches the maximum value. For example, the base station may synchronize the count value of the PUR release counter to equal a maximum value of the PUR release counter. In this case, the UE and the base station may perform a random access procedure or an early data transmission procedure based at least in part on synchronizing the count value of the PUR release counter to equal the maximum value of the PUR release counter.

At 830, the base station may determine whether the base station is to modify a maximum value of the PUR release counter. As just one example, the base station may determine that the maximum value of the PUR release counter is to be modified based at least in part on network load. In this case, if network load has increased, the base station may reduce the maximum value so that the UE can skip fewer PURs. In some aspects, the base station may modify the maximum value of the PUR release counter (block 830—YES). In this case, at 835, the base station may transmit the configuration of the PUR release counter including the parameter regarding the maximum value of the PUR release counter, and, at 840, may set the count value to an initial value based at least in part on the configuration of the PUR release counter. Thereafter, the base station may proceed to block 825.

If the base station does not modify the maximum value (block 830—NO), then, at 845, the base station may transmit the configuration of the PUR release counter including no parameter indicating the maximum value of the PUR release counter. Alternatively, the base station may transmit a configuration of a PUR release counter indicating a same parameter. The base station may set the count value to an initial value based at least in part on the configuration at 850, may maintain a prior value of the PUR release counter as the count value based at least in part on the configuration at 855, or may set the value of the PUR release counter to an initial value. Thereafter, the base station may proceed to block 825.

Method 800 may include additional aspects, such as any single aspect or any combination of aspects described above, below, and/or in connection with one or more other processes described elsewhere herein.

In a first aspect, method 800 may include receiving, before the count value of the PUR release counter is synchronized, an indication of the count value of the PUR release counter.

In a second aspect, alone or in combination with the first aspect, method 800 may include synchronizing the count value to match the indication of the count value.

In a third aspect, alone or in combination with one or more of the first through second aspects, method 800 may include determining a selected count value for the PUR release counter; and transmitting an indication of the selected count value for the PUR release counter, wherein the synchronization is performed in accordance with the indication of the selected count value for the PUR release counter.

In a fourth aspect, alone or in combination with one or more of the first through third aspects, method 800 may include receiving, before the count value is synchronized and before the indication of the selected count value is transmitted, an indication of the count value of the PUR release counter.

In a fifth aspect, alone or in combination with one or more of the first through fourth aspects, the selected count value for the PUR release counter matches the indication of the count value of the PUR release counter.

In a sixth aspect, alone or in combination with one or more of the first through fifth aspects, the selected count value for the PUR release counter is different from the indication of the count value of the PUR release counter.

In a seventh aspect, alone or in combination with one or more of the first through sixth aspects, method 800 may include synchronizing the count value of the PUR release counter to equal a maximum value of the PUR release counter, wherein synchronizing the count value of the PUR release counter to equal the maximum value of the PUR release counter triggers a fallback to a random access procedure or an early data transmission procedure.

In an eighth aspect, alone or in combination with one or more of the first through seventh aspects, method 800 may include setting the count value to an initial value.

In a ninth aspect, alone or in combination with the eighth aspect, method 800 may include modifying the maximum value of the PUR release counter, wherein the configuration of the PUR release counter indicates a parameter indicating a maximum value for the PUR release counter; and setting the count value to an initial value.

In a tenth aspect, alone or in combination with one or more of the first through ninth aspects, method 800 may setting a prior maximum value of the PUR release counter, wherein the configuration of the PUR release counter includes no parameter indicating a maximum value of the PUR release counter; and setting the count value to an initial value.

In an eleventh aspect, alone or in combination with one or more of the eighth and ninth aspects, method 800 may deactivating the PUR release counter, wherein the configuration of the PUR release counter includes no parameter indicating a maximum value of the PUR release counter.

In a twelfth aspect, alone or in combination with one or more of the eighth and ninth aspects, the initial value is zero.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
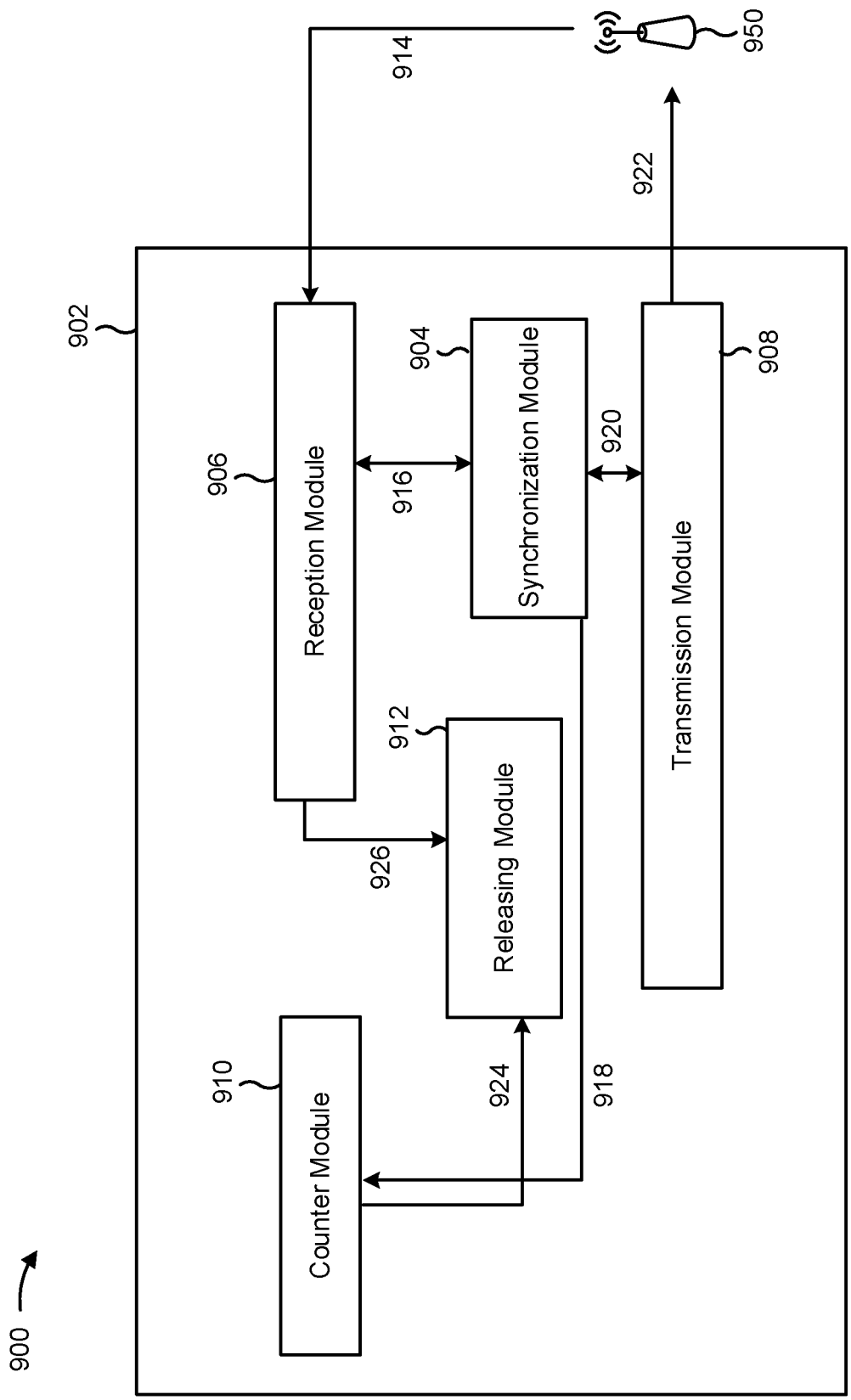
FIG. 9 is a conceptual data flow diagram illustrating the data flow between different modules/means/components in an example apparatus, in accordance with various aspects of the present disclosure.

FIG. 9 is a conceptual data flow diagram 900 illustrating the data flow between different modules/means/components in an example apparatus 902. The apparatus 902 may be a UE. In some aspects, the apparatus 902 includes a synchronization module 904, a reception module 906, a transmission module 908, a counter module 910, and/or a releasing module 912.

The synchronization module 904 may synchronize a count value of a PUR release counter in connection with at least one of the UE entering a connected mode, or the UE receiving a configuration of the PUR release counter. For example, in some aspects, the reception module 906 may receive signals 914 from a base station 950. In some aspects, the signals 914 may indicate a selected count value for the PUR release counter. In this case, the reception module 906 may provide data 916 to the synchronization module 904 indicating the selected count value (e.g., after demodulating or decoding the signals 914), and the synchronization module may synchronize the PUR release counter in accordance with the selected count value. For example, the synchronization module 904 may provide an indication 918 to the counter module 910, and the counter module 910 may update the count value to match the selected count value. In some aspects, the synchronization module 904, or the counter module 910, may provide an indication 920 of a current count value of the PUR release counter to the transmission module 908. The transmission module 908 may transmit the indication 920 of the current count value to the BS 950 as signals 922.

In some aspects, the synchronization module 904 may synchronize the PUR release counter based at least in part on a configuration of the PUR release counter. For example, the reception module 906 may receive the configuration as signals 914, and may provide the configuration to the synchronization module as data 916 (e.g., after demodulating or decoding the signals 914). The synchronization module 904 may synchronize the PUR release counter in accordance with the configuration by providing an indication 918 to the counter module 910, as described elsewhere herein.

In some aspects, the counter module 910 may cause the releasing module 912 to release the PUR. For example, the counter module 910 may determine that a count value of the PUR release counter matches a maximum value of the PUR release counter. In this case, the counter module 910 may provide an indication 924 to the releasing module 912 to cause the releasing module 912 to release the PUR. In some aspects, another module, such as the reception module 906, may provide an indication 926 that the releasing module 912 is to release the PUR (e.g., based at least in part on receiving such an indication from the BS 950).

The apparatus may include additional modules that perform each of the blocks of the algorithm in the aforementioned method 700 of FIG. 7 and/or the like. Each block in the aforementioned method 700 of FIG. 7 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
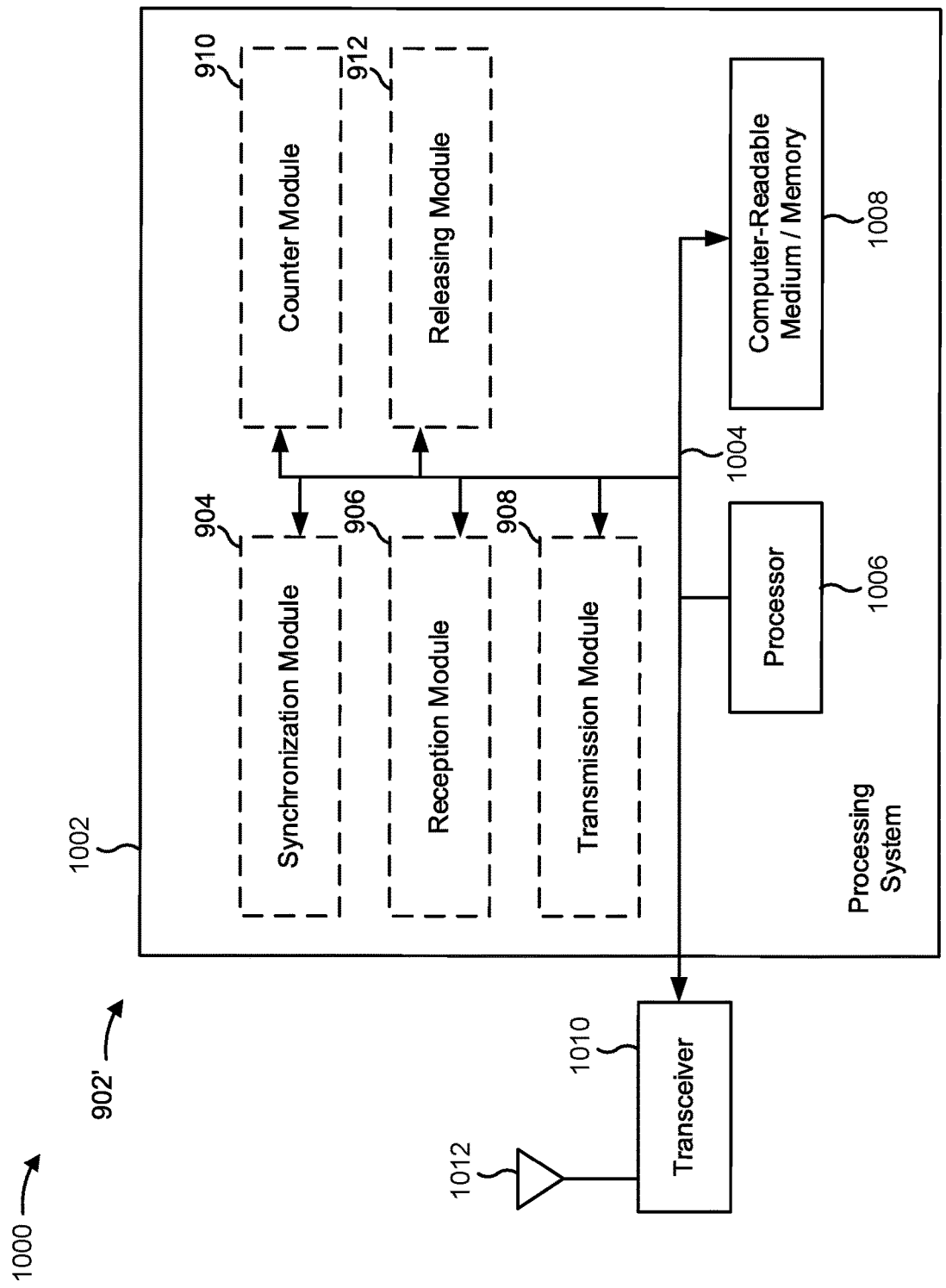
FIG. 10 is a diagram illustrating an example of a hardware implementation for an apparatus employing a processing system, in accordance with various aspects of the present disclosure.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, 912, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception module 906. In addition, the transceiver 1010 receives information from the processing system 1002, specifically the transmission module 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904, 906, 908, 910, and 912. The modules may be software modules running in the processor 1006, resident/stored in the computer readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for synchronizing, with a base station, a count value of a preconfigured uplink resource (PUR) release counter in connection with at least one of: the UE entering a connected mode, or the UE receiving a configuration of the PUR release counter; means for selectively performing a transmission using a PUR or releasing the PUR based at least in part on the count value of the PUR release counter; means for transmitting, before the count value of the PUR release counter is synchronized, an indication of the count value of the PUR release counter; means for receiving, from the base station, an indication of a selected count value for the PUR release counter, wherein the synchronization is performed in accordance with the indication of the selected count value for the PUR release counter; means for performing a random access procedure or an early data transmission procedure based at least in part on synchronizing the count value of the PUR release counter to equal the maximum value of the PUR release counter; means for setting the count value to an initial value; means for modifying the maximum value of the PUR release counter based at least in part on the modification; means for setting the count value to an initial value based at least in part on the configuration; means for setting a prior maximum value of the PUR release counter based at least in part on the configuration; means for maintaining a prior value of the PUR release counter as the count value based at least in part on the configuration; means for deactivating the PUR release counter based at least in part on the configuration of the PUR release counter including no parameter indicating a maximum value of the PUR release counter; means for receiving, from the base station, a message without a selected count value, the message indicating that the count value of the UE is synchronized with a count value of the base station; and means for entering the connected mode;

means for receiving the configuration of the PUR release counter. The aforementioned means may be one or more of the aforementioned modules of the apparatus 902 and/or the processing system 1002 of the apparatus 902' configured to perform the functions recited by the aforementioned means. As described elsewhere herein, the processing system 1002 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 10 is provided as an example. Other examples may differ from what is described in connection with FIG. 10.

Figure 11:
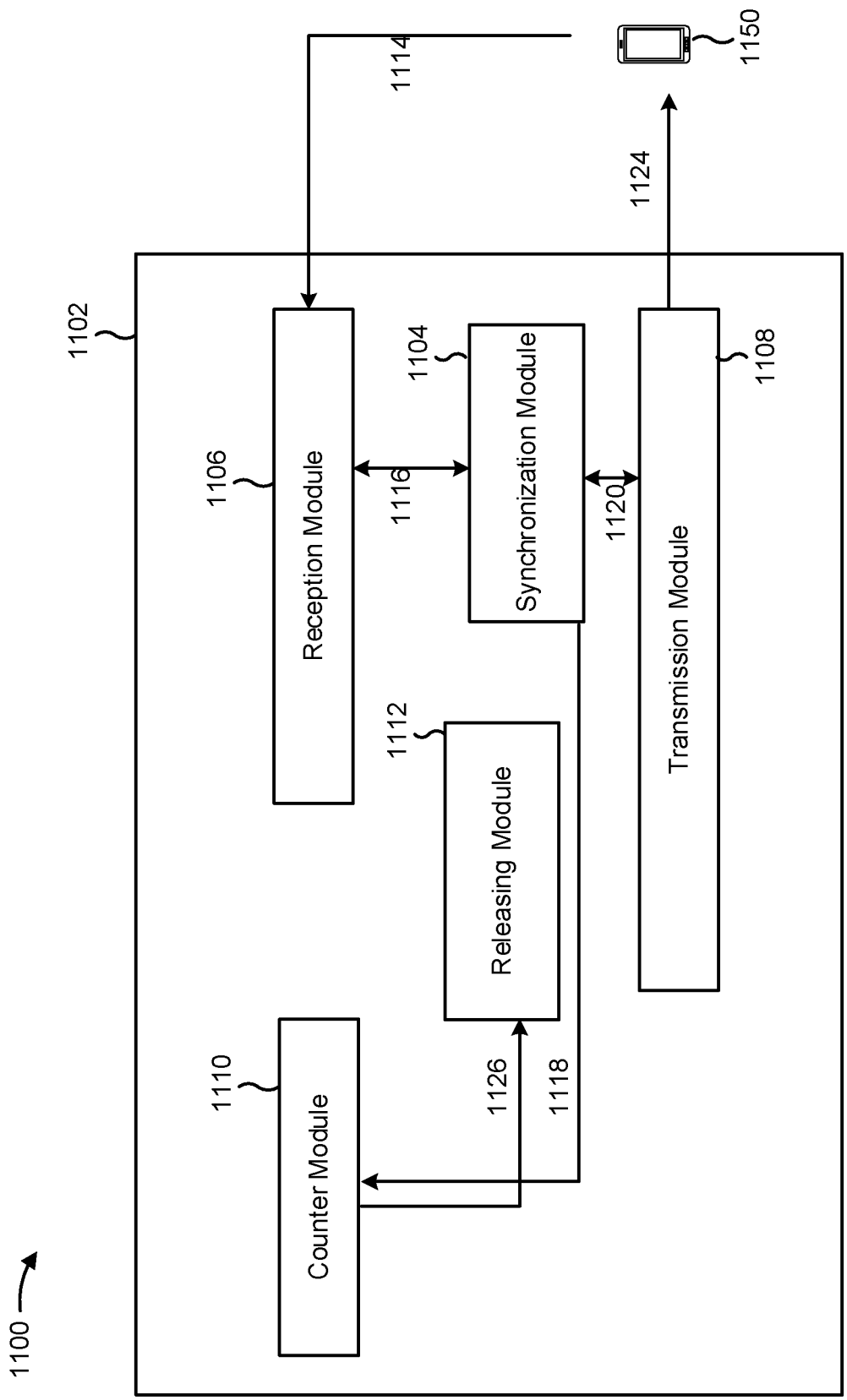
FIG. 11 is a conceptual data flow diagram illustrating the data flow between different modules/means/components in an example apparatus, in accordance with various aspects of the present disclosure.

FIG. 11 is a conceptual data flow diagram 1100 illustrating the data flow between different modules/means/components in an example apparatus 1102. The apparatus 1102 may be a base station. In some aspects, the apparatus 1102 includes a synchronization module 1104, a reception module 1106, a transmission module 1108, a counter module 1110, and/or a releasing module 1112.

The synchronization module 1104 may synchronize a count value of a PUR release counter in connection with at least one of the UE entering a connected mode, or transmitting a configuration of the PUR release counter. For example, in some aspects, the reception module 1106 may receive signals 1114 from a UE 1150. In some aspects, the signals 1114 may indicate a count value for the PUR release counter. In this case, the reception module 1106 may provide data 1116 to the synchronization module 1104 indicating the count value (e.g., after demodulating or decoding the signals 1114). In some aspects, the synchronization module may synchronize the PUR release counter in accordance with the count value. For example, the synchronization module 1104 may provide an indication 1118 to the counter module 1110, and the counter module 1110 may update the count value to match the received count value. In some aspects, the synchronization module 1104 may determine a selected count value, which may or may not match the received count value. The synchronization module 1104 may provide an indication 1120 of the selected count value to the transmission module 1108 for transmission to the UE 1150, and may provide an indication 1118 of the selected count value to the counter module 1110 for updating of the PUR resource counter.

In some aspects, the synchronization module 1104 may generate a configuration of the PUR release counter. For example, the transmission module 1108 may transmit the configuration as signals 1124. The configuration may be generated based at least in part on the count value and/or the maximum value to be synchronized between the apparatus 1102 and the UE 1150. For example, the configuration may or may not indicate a parameter indicating the maximum value based at least in part on whether the maximum value and/or the count value are to be modified or reset. Additionally, or alternatively, the transmission module 1108 may transmit, as signals 1124, an indication of a selected count value selected by the synchronization module 1104.

In some aspects, the counter module 1110 may cause the releasing module 1112 to release the PUR. For example, the counter module 1110 may determine that a count value of the PUR release counter matches a maximum value of the PUR release counter. In this case, the counter module 1110 may provide an indication 1126 to the releasing module 1112 to cause the releasing module 1112 to release the PUR.

The apparatus may include additional modules that perform each of the blocks of the algorithm in the aforementioned method 800 of FIG. 8 and/or the like. Each block in the aforementioned method 800 of FIG. 8 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
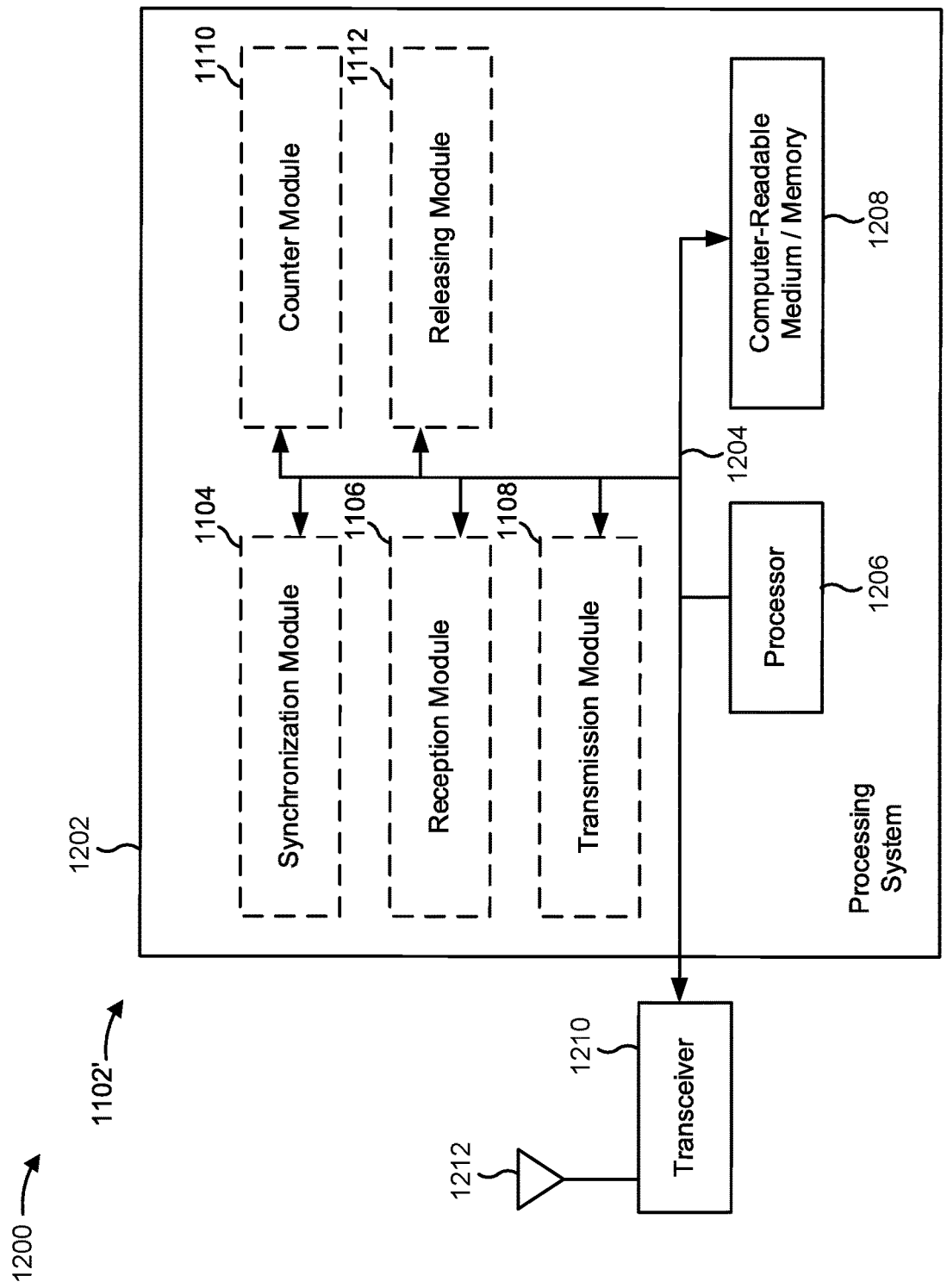
FIG. 12 is a diagram illustrating an example of a hardware implementation for an apparatus employing a processing system, in accordance with various aspects of the present disclosure.

FIG. 12 is a diagram 1200 illustrating an example of a hardware implementation for an apparatus 1102' employing a processing system 1202. The apparatus 1102' may be a base station.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, 1110, 1112, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception module 1106. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the modules 1104, 1106, 1108, 1110, and 1112. The modules may be software modules running in the processor 1206, resident/stored in the computer readable medium/memory 1208, one or more hardware modules coupled to the processor 1206, or some combination thereof. The processing system 1202 may be a component of the UE 120 and may include the memory 282 and/or at least one of the TX MIMO processor 266, the RX processor 258, and/or the controller/processor 280.

In some aspects, the apparatus 1102/1102' for wireless communication includes means for synchronizing, with a user equipment (UE), a count value of a preconfigured uplink resource (PUR) release counter of the UE in connection with at least one of: the UE entering a connected mode, or transmitting a configuration of the PUR release counter to the UE; means for selectively receiving a transmission using a PUR or releasing the PUR based at least in part on the count value of the PUR release counter; means for receiving, before the count value of the PUR release counter is synchronized, an indication of the count value of the PUR release counter; means for synchronizing the count value to match the indication of the count value; means for determining a selected count value for the PUR release counter; means for transmitting an indication of the selected count value for the PUR release counter, wherein the synchronization is performed in accordance with the indication of the selected count value for the PUR release counter; means for receiving, before the count value is synchronized and before the indication of the selected count value is transmitted, an indication of the count value of the PUR release counter; means for synchronizing the count value of the PUR release counter to equal a maximum value of the PUR release counter, wherein synchronizing the count value of the PUR release counter to equal the maximum value of the PUR release counter triggers a fallback to a random access procedure or an early data transmission procedure; means for setting the count value to an initial value; means for modifying the maximum value of the PUR release counter, wherein the configuration of the PUR release counter indicates a parameter indicating a maximum value for the PUR release counter; means for setting the count value to an initial value; means for setting a prior maximum value of the PUR release counter, wherein the configuration of the PUR release counter includes no parameter indicating a maximum value of the PUR release counter; means for maintaining a prior count value of the PUR release counter as the count value; and/or means for deactivating the PUR release counter, wherein the configuration of the PUR release counter includes no parameter indicating a maximum value of the PUR release counter. The aforementioned means may be one or more of the aforementioned modules of the apparatus 1102 and/or the processing system 1202 of the apparatus 1102' configured to perform the functions recited by the aforementioned means. As described elsewhere herein, the processing system 1202 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 12 is provided as an example. Other examples may differ from what is described in connection with FIG. 12.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE) configured with a preconfigured uplink resource (PUR), comprising:
   receiving a configuration indicating a particular value for a PUR release counter of the UE;
   skipping a transmission using the PUR based at least in part on receiving the configuration;
   selectively, based at least in part on skipping the transmission using the PUR:
      performing another transmission using the PUR when a count value of the PUR release counter does not match the particular value for the PUR release counter, or
      releasing the PUR when the count value of the PUR release counter matches the particular value for the PUR release counter;
   receiving another configuration of the PUR release counter,
      wherein the other configuration includes no parameter indicating the particular value for the PUR release counter; and
   deactivating the PUR release counter based at least in part on the other configuration including no parameter indicating the particular value for the PUR release counter.

2. The method of claim 1, further comprising:
   synchronizing the count value of the PUR release counter in connection with receiving the configuration.

3. The method of claim 1, further comprising:
   setting, based at least in part on receiving the configuration, the count value of the PUR release counter to an initial value, wherein the initial value is zero.

4. The method of claim 1, wherein the configuration indicates a pur-ImplicitReleaseAfter parameter indicating the particular value for the PUR release counter.

5. The method of claim 1, wherein the configuration is included in a radio resource control (RRC) message.

6. The method of claim 1, further comprising:
entering a radio resource control (RRC) idle mode; and
wherein skipping the transmission using the PUR comprises:
skipping the transmission using the PUR based at least in part on entering the RRC idle mode.

7. A method of wireless communication performed by a network entity, comprising:
transmitting a configuration indicating a particular value for a preconfigured uplink resource (PUR) release counter;
determining that a transmission using a PUR is not received based at least in part on transmitting the configuration;
selectively, based at least in part on the transmission using the PUR not being received:
receiving another transmission using the PUR when a count value of the PUR release counter does not match the particular value for the PUR release counter, or
releasing the PUR when the count value of the PUR release counter matches the particular value for the PUR release counter; and
transmitting another configuration of the PUR release counter,
wherein the other configuration includes no parameter indicating the particular value for the PUR release counter; and
deactivating the PUR release counter.

8. The method of claim 7, further comprising:
synchronizing the count value of the PUR release counter in connection with transmitting the configuration.

9. The method of claim 7, further comprising:
setting the particular value of the PUR release counter, wherein the configuration indicates a pur-ImplicitReleaseAfter parameter indicating the particular value for the PUR release counter.

10. The method of claim 7, wherein the configuration is included in a radio resource control (RRC) message.

11. The method of claim 7, further comprising:
updating the PUR release counter based at least in part on the transmission using the PUR not being received.

12. A user equipment (UE) for wireless communication, comprising:
a memory; and
one or more processors coupled to the memory, the one or more processors configured to:
receive a configuration indicating a particular value for a preconfigured uplink resource (PUR) release counter of the UE;
skip a transmission using a PUR based at least in part on receiving the configuration;
selectively, based at least in part on skipping the transmission using the PUR:
perform another transmission using the PUR when a count value of the PUR release counter does not match the particular value for the PUR release counter, or
release the PUR when the count value of the PUR release counter matches the particular value for the PUR release counter; and
receive another configuration of the PUR release counter,
wherein the other configuration includes no parameter indicating the particular value for the PUR release counter; and
deactivate the PUR release counter based at least in part on the other configuration including no parameter indicating the particular value for the PUR release counter.

13. The UE of claim 12, wherein the one or more processors are further configured to:
synchronize the count value of the PUR release counter in connection with receiving the configuration.

14. The UE of claim 12, wherein the one or more processors are further configured to:
set, based at least in part on receiving the configuration, the count value of the PUR release counter to an initial value, wherein the initial value is zero.

15. The UE of claim 12, wherein the configuration indicates a pur-ImplicitReleaseAfter parameter indicating the particular value for the PUR release counter.

16. The UE of claim 12, wherein the configuration is included in a radio resource control (RRC) message.

17. The UE of claim 12, wherein the one or more processors are further configured to:
enter a radio resource control (RRC) idle mode; and
wherein the one or more processors, to skip the transmission using the PUR, are configured to:
skip the transmission using the PUR based at least in part on entering the RRC idle mode.

18. A network entity for wireless communication, comprising:
a memory; and
one or more processors coupled to the memory, the one or more processors configured to:
transmit a configuration indicating a particular value for a preconfigured uplink resource (PUR) release counter;
determine that a transmission using a PUR is not received based at least in part on transmitting the configuration;
selectively, based at least in part on the transmission using the PUR not being received:
receive another transmission using the PUR when a count value of the PUR release counter does not match the particular value for the PUR release counter, or
release the PUR when the count value of the PUR release counter matches the particular value for the PUR release counter;
transmit another configuration of the PUR release counter,
wherein the other configuration includes no parameter indicating the particular value for the PUR release counter; and
deactivate the PUR release counter.

19. The network entity of claim 18, wherein the one or more processors are configured to:
synchronize the count value of the PUR release counter in connection with transmitting the configuration.

20. The network entity of claim 18, wherein the configuration indicates a pur-ImplicitReleaseAfter parameter indicating the particular value for the PUR release counter.

21. The network entity of claim 18, wherein the one or more processors are configured to:
update the PUR release counter based at least in part on the transmission using the PUR not being received.

22. An apparatus for wireless communication, comprising:
  means for receiving a configuration indicating a particular value for a preconfigured uplink resource (PUR) release counter;
  means for skipping a transmission using a PUR based at least in part on receiving the configuration;
  means for selectively, based at least in part on the transmission using the PUR being skipped:
    performing another transmission using the PUR when a count value of the PUR release counter does not match the particular value for the PUR release counter, or
    releasing the PUR when the count value of the PUR release counter matches the particular value for the PUR release counter;
  means for receiving another configuration of the PUR release counter,
    wherein the other configuration includes no parameter indicating the particular value for the PUR release counter; and
  means for deactivating the PUR release counter based at least in part on the other configuration including no parameter indicating the particular value of the PUR release counter.

23. The apparatus of claim 22, further comprising:
  means for synchronizing the count value of the PUR release counter in connection with receiving the configuration.

24. The apparatus of claim 22, further comprising:
  means for setting, based at least in part on receiving the configuration, the count value of the PUR release counter to an initial value, wherein the initial value is zero.

25. The apparatus of claim 22, wherein the configuration indicates a pur-ImplicitReleaseAfter parameter indicating the particular value for the PUR release counter.

26. The apparatus of claim 22, wherein the configuration is included in a radio resource control (RRC) message.

27. The apparatus of claim 22, further comprising:
  means for entering a radio resource control (RRC) idle mode; and
  wherein the means for skipping the transmission using the PUR comprises:
    means for skipping the transmission using the PUR based at least in part on entering the RRC idle mode.

28. An apparatus for wireless communication, comprising:
  means for transmitting a configuration indicating a particular value for a preconfigured uplink resource (PUR) release counter;
  means for determining that a transmission using a PUR is not received based at least in part on transmitting the configuration;
  means for selectively, based at least in part on the transmission using the PUR not being received:
    receiving another transmission using the PUR when a count value of the PUR release counter does not match the particular value for the PUR release counter, or
    releasing the PUR when the count value of the PUR release counter matches the particular value for the PUR release counter;
  means for transmitting another configuration of the PUR release counter,
    wherein the other configuration of the PUR release counter includes no parameter indicating the particular value for the PUR release counter; and
  means for deactivating the PUR release counter.

29. The apparatus of claim 28, further comprising:
  means for synchronizing the count value of the PUR release counter in connection with transmitting the configuration of the PUR release counter.

30. The apparatus of claim 28, further comprising:
  means for setting the particular value of the PUR release counter, wherein the configuration indicates a pur-ImplicitReleaseAfter parameter indicating the particular value for the PUR release counter.

31. The apparatus of claim 28, wherein the configuration is included in a radio resource control (RRC) message.

32. The apparatus of claim 28, further comprising:
  means for updating the PUR release counter based at least in part on the transmission using the PUR not being received.

* * * * *